(No Model.)
H. T. FOSTER.
SINGLETREE.
No. 554,175. Patented Feb. 4, 1896.
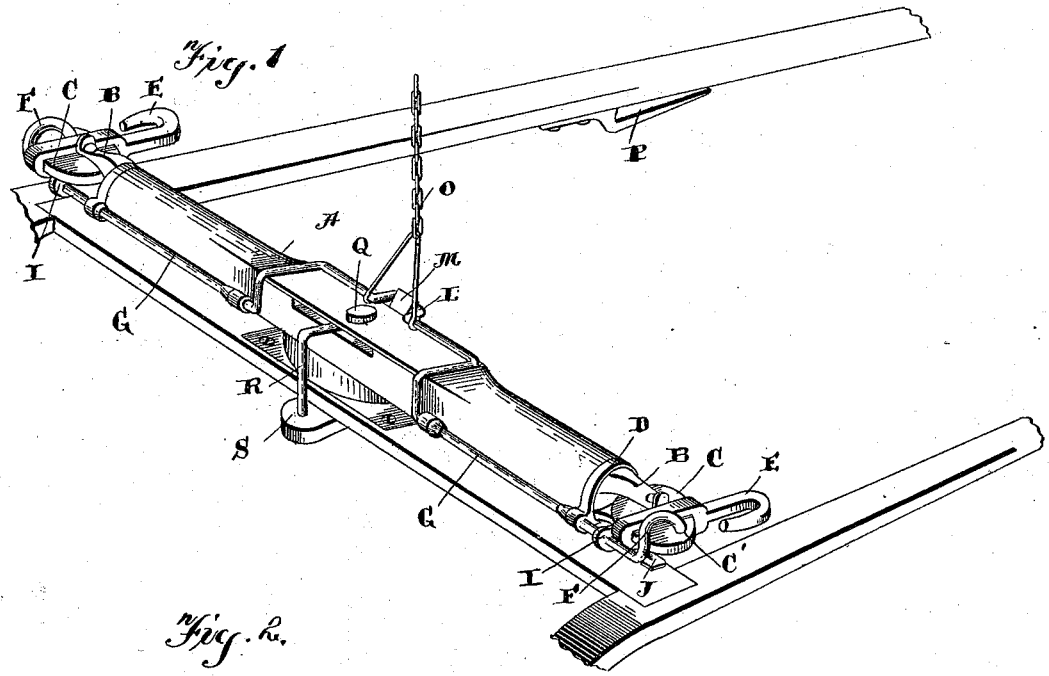
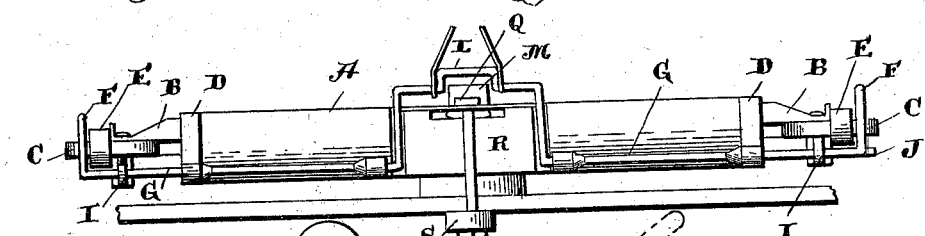
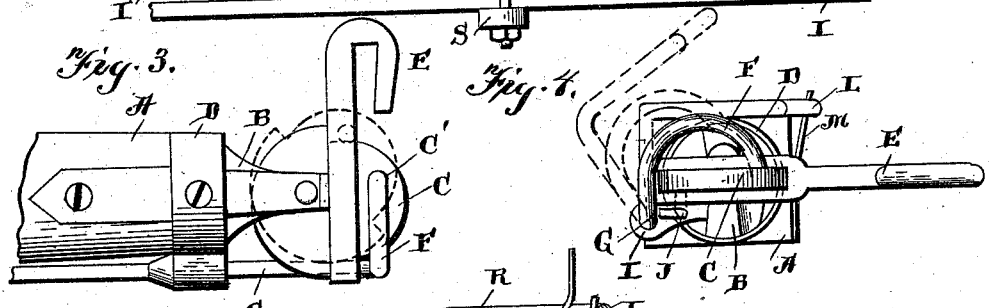
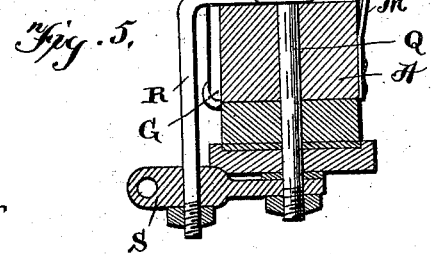
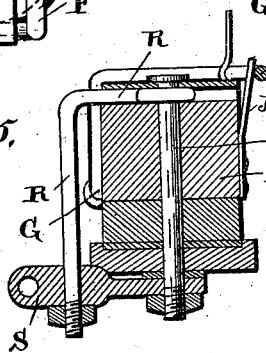
Witnesses:
Inventor.
Attorneys

UNITED STATES PATENT OFFICE.

HENRY THOMAS FOSTER, OF ROCKWOOD, TENNESSEE.

SINGLETREE.

SPECIFICATION forming part of Letters Patent No. 554,175, dated February 4, 1896.

Application filed July 16, 1895. Serial No. 556,159. (No model.)

*To all whom it may concern:*

Be it known that I, HENRY THOMAS FOSTER, of Rockwood, in the county of Roane and State of Tennessee, have invented certain new and useful Improvements in Singletrees; and I do hereby declare the following to be a full, clear, and exact description of the invention, such as will enable others skilled in the art to which it pertains to make and use it, reference being had to the accompanying drawings, which form part of this specification.

This invention pertains to improvements in singletrees, and the object of the same is to provide improved devices for securing the traces thereto and releasing them therefrom; and a further object is to so secure the singletree to the thill-bar or doubletree, as the case may be, that it will not bend forward out of position when subjected to strain, thus relieving the parts of much of the wear incident thereto as now generally arranged.

With these objects in view my invention consists in the novel features of construction hereinafter fully described and claimed, and illustrated by the accompanying drawings, in which—

Figure 1 is a perspective view of a pair of shafts or thills having a singletree provided with my improvement. Fig. 2 is a rear elevation of the singletree, showing the devices tripped for permitting the animal to pass from the shafts. Fig. 3 is a plan view of one of the singletree ends when in the position illustrated in Fig. 2. Fig. 4 is an end view of the singletree. Fig. 5 is a vertical cross-sectional view showing the attachment of the singletree to the thill-bar.

A designates the singletree, and B the short perforated arms extending from the ends thereof, the arms being slightly separated and confining the turning head C. The arms B are held in position on the singletree ends by the metallic rings D. Trace-hooks E are adapted to fit over the turning heads, and the latter are provided upon their outer edges with the perforations C', which are engaged by hooks F on the extremities of the bail or shaft G, so as to prevent the said heads from turning and releasing the said trace-hooks. Bearings for the said bail or turning shaft are provided at intervals upon the singletree, and bearings I are secured to the under sides of arms B, so as to form a secure support for the shaft immediately inside of the head-engaging hooks. Bearing I is provided with a thumbscrew J, adapted to have its head turned up in the way of the turning head C, so as to prevent the latter from so rotating as to disengage the trace-hooks therefrom. This is so arranged in order that after one trace is secured in position the other may be applied to the turning head at the opposite end of the singletree, and then the securing-hooks positioned in unison without the trace first secured having in the meantime become detached.

The turning bail or shaft is bent upward between its ends, and then bent at an angle over the singletree, where it is formed with the offset L, adapted to be engaged by the vertical spring M on the front side of the tree, which holds the said turning bail or shaft in proper position. An upward pull of this bail or shaft against the pressure of the said spring will release it, and thus turn the hooks from engagement with the turning head, thus permitting the trace-hooks to be freed therefrom. For effecting a rapid detachment, such as described, the forward portion of the bail is provided with the loop to which the chain O is attached and extended to the vehicle, so that when the necessity arises the same may be quickly drawn upon, thus instantly releasing the horses from the shafts. The holdback-tugs are adapted to be slipped over the shaft and be engaged by the hooks P on the under side thereof, and thus no permanent connection is made by the holdback devices such as to impede the free outward movement of the horse when once released from the singletree.

For securing the singletree to the thill-bar I employ a bolt Q of the usual construction for securing the parts together, and extend rearward from the under side of the thill-bar the plate or arm S, having the vertical perforation. From the top side of the singletree I extend rearward the angle iron or clip R, which is confined by the upper end of the bolt, while its rear vertical branch extends downward to the arm S, passing through the perforations thereof, where it is secured by the nut. Thus by keeping the said nut tight the singletree may at all times be retained in a proper position, the devices described holding it securely from forward movement and displacement.

The invention is here shown and described as attached to a pair of thills, but singletrees may be attached in a similar manner to a doubletree when two horses are to be used in the manner and with equal effect.

Having thus described my invention, what I claim, and desire to secure by Letters Patent, is—

1. The combination of a singletree, the flat metallic turning heads C pivoted at the extremities of the tree and formed with apertures C' eccentric to the pivots of the heads, the spaces between the said pivots and apertures being sufficient to accommodate the looped trace-hooks E which are slipped thereover, shaft G arranged longitudinally with the tree and adapted to turn in bearings thereon, and hooks F formed by turning the extremities of the shaft at right angles and curving the same, whereby when the shaft is properly turned the hooks will engage apertures C' and hold heads C from turning, substantially as shown and described.

2. The combination of the singletree, the turning heads carried by the ends thereof, the bail carried by the singletree, hooks at the ends of the bail for engaging the said heads, the headed screw for engaging one of said heads to prevent it from turning for the purpose stated, and a means for holding the bail so as to prevent the hooks from disengaging the said heads, substantially as shown and described.

In testimony whereof I affix my signature in presence of two witnesses.

HENRY THOMAS FOSTER.

Witnesses:
    FRANK B. McELWEE,
    HENRY RICHARDS.